US006550844B1

(12) United States Patent
Santiago

(10) Patent No.: US 6,550,844 B1
(45) Date of Patent: Apr. 22, 2003

(54) VEHICLE BODY PROTECTOR

(76) Inventor: Carolyn T. Santiago, 3726 Branch Way, Indianapolis, IN (US) 46268

( * ) Notice: Subject to any disclaimer, the term of this patent is extended or adjusted under 35 U.S.C. 154(b) by 0 days.

(21) Appl. No.: 10/108,738

(22) Filed: Mar. 28, 2002

(51) Int. Cl.[7] .............................. B60J 7/20; B60R 19/42
(52) U.S. Cl. ..................... 296/136; 296/37.13; 293/128
(58) Field of Search .............................. 296/136, 37.13; 293/128; 49/462; 280/770

(56) References Cited

U.S. PATENT DOCUMENTS

| | | | | |
|---|---|---|---|---|
| 3,563,594 A | * | 2/1971 | London ........................ | 293/128 |
| 4,041,999 A | * | 8/1977 | Miller .......................... | 296/136 |
| 4,219,218 A | | 8/1980 | Waldon | |
| 4,372,083 A | * | 2/1983 | Hatzikelis et al. ............. | 49/462 |
| 4,493,502 A | * | 1/1985 | Campbell, Jr. ............... | 293/128 |
| 4,781,231 A | * | 11/1988 | Garcia et al. ............. | 296/37.13 |
| 4,810,015 A | * | 3/1989 | McNeil ........................ | 296/136 |
| 4,896,911 A | * | 1/1990 | Duke ........................... | 296/136 |
| 4,935,638 A | * | 6/1990 | Straka ......................... | 280/770 |
| 4,997,229 A | | 3/1991 | Swanson | |
| 5,035,938 A | * | 7/1991 | Truett .......................... | 296/136 |
| 5,056,817 A | * | 10/1991 | Fuller .......................... | 296/136 |
| 5,139,306 A | * | 8/1992 | Ott et al. .................... | 280/770 |
| 5,162,139 A | * | 11/1992 | Gomez et al. ............... | 293/128 |
| 5,184,857 A | * | 2/1993 | Hawkins ..................... | 293/128 |
| 5,193,869 A | * | 3/1993 | Land ........................... | 293/128 |
| 5,333,923 A | * | 8/1994 | Whitfield ..................... | 293/128 |
| 5,424,924 A | | 6/1995 | Ewing et al. | |
| 5,518,283 A | * | 5/1996 | Egelske ....................... | 293/128 |
| D400,845 S | | 11/1998 | Miller et al. | |
| 5,879,045 A | * | 3/1999 | Logan ......................... | 296/136 |
| 5,947,520 A | * | 9/1999 | McHorse .................... | 280/770 |
| 5,975,599 A | * | 11/1999 | Goldstein .................... | 293/128 |
| 5,975,621 A | | 11/1999 | Lefevre | |
| 6,371,547 B1 | * | 4/2002 | Halbrook .................... | 296/136 |
| 2002/0113458 A1 | * | 8/2002 | Heiland ....................... | 296/136 |

* cited by examiner

Primary Examiner—Kiran Patel
(74) Attorney, Agent, or Firm—Brinks Hofer Gilson & Lione

(57) ABSTRACT

Vehicle body protectors for protecting external mirrors and a lower portions of the vehicle extending from a rear surface of the front wheel well to a front surface of the rear wheel well under the doors of the vehicle are constructed from conformable sheets of impact absorbing material having peripheral means for coupling the protector to non-external portions of the vehicle body and to other portions of the protector so that the body protectors remain in fixed position on the vehicle body during motion of the vehicle. The body protectors can be formed from more than one layer of material to form an outer layer, a liner layer of resilient energy absorbing material positioned on the under surface of the outer layer for engagement with an outer surface of the vehicle body, and optionally an intermediate reinforcing layer. At least the liner layer comprises a hydrophobic material and the outer layer includes channels for drawing water away from the liner layer to inhibit any contribution to vehicle body corrosion.

10 Claims, 3 Drawing Sheets

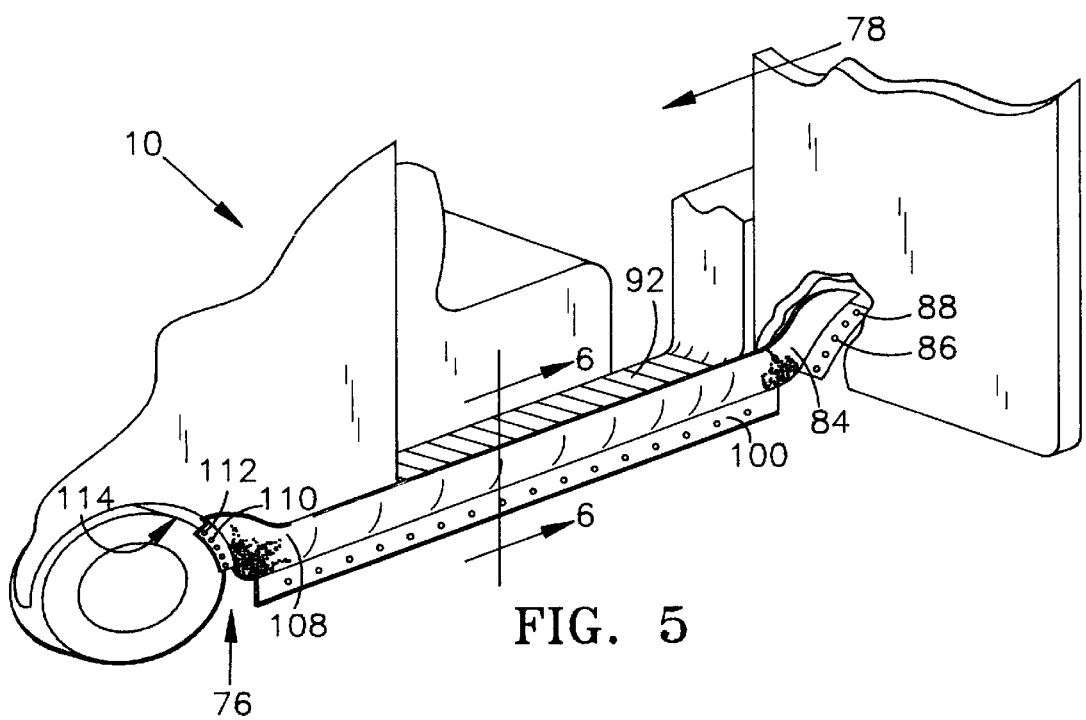
FIG. 5
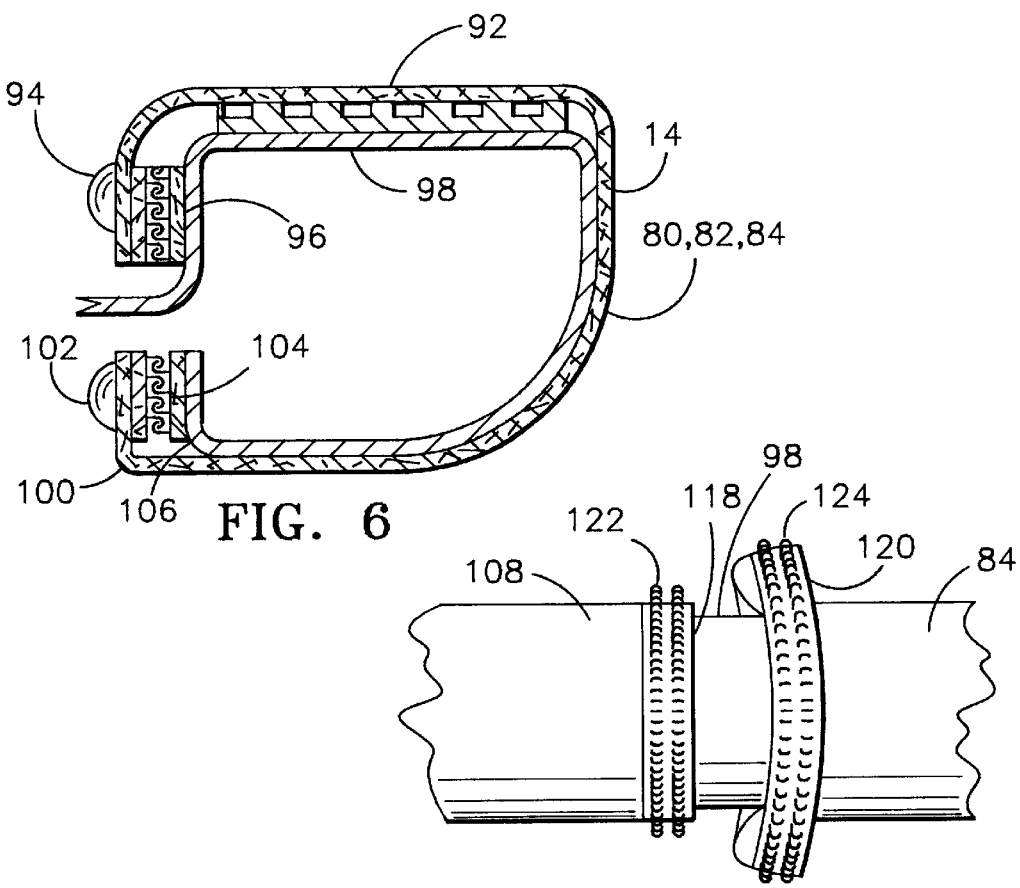
FIG. 6
FIG. 7

VEHICLE BODY PROTECTOR

BACKGROUND OF THE INVENTION

This invention pertains generally to devices for protecting the finish on vehicles while the vehicles are being driven. The invention particularly pertains to devices for protecting vehicle finishes from chipping, scratching and other abrasion resulting from gravel, rocks and other flying debris that may be kicked up by either the protected vehicle or other passing vehicles. The invention is directed to portions of the vehicle body that are particularly prone to such damage, but are not protected by common vehicle nose bras.

Vehicle nose bras are known that have a variety of shapes and features as disclosed, for example, in U.S. Pat. Nos. 4,219,218; 4,997,229; 5,056,817; 5,424,924; 5,975,621; and D 400,845. Vehicle nose bras typically cover a front portion of the hood, a front portion of the fenders, and generally the grill and front bumper, and some immediately adjacent portions of a vehicle. The general purpose of such vehicle nose bras is to prevent, or at least inhibit, body damage arising from flying road debris such as stones, as well as bug stains, road grime, and tar as the vehicle is being driven. The nose bras are generally constructed as a protective cover formed to fit over the affected portion of the vehicle and to be secured in place with spring clamps, tensioning cords, webbing, tabs, hook and eye fabric fasteners, and/or magnets. The protective cover forming the vehicle nose bras is typically made from vinyl or other heat resistant plastic that can have a backing of fleece, foam, felt or other soft material.

Although the various structural elements to form vehicle nose bras have been available for many years, and considerable experience has been gained in the field that permits those skilled in the art to design workable vehicle nose bras that conform to the many models of vehicles on the market, there has been no development of vehicle body protectors for other areas of vehicles that suffer comparable rates of body damage due to flying debris, It is therefore an object of the present invention to employ the materials and principals reflecting the general state of the art in vehicle nose bras to construct protectors for other portions of motor vehicles. It is a further object to avoid some of the negative characteristics that have been reported with respect to certain nose bras. It is a further object to present an attractive addition to vehicle protective hardware that can easily be adapted for a variety of models of vehicles.

SUMMARY OF THE INVENTION

Accordingly, a first vehicle body protector of the present invention is intended to protect an external mirror that includes a shell having a forward-facing decorative surface. The mirror also includes a rearward-facing reflective surface that generally has a perimeter that is spaced from the shell to permit adjustment of the reflective portion without requiring movement of the shell. The external mirror is typically coupled to a door of a motor vehicle so that a driver of the vehicle can view the left or right side of the vehicle. The vehicle body protector for the external mirror includes an enveloping portion contoured to fit over the decorative forward-facing surface of the exterior mirror shell. A collar portion is contoured to surround the shell, yet leave exposed, the rearward-facing reflective surface. A cuff portion includes fasteners that are adapted to engage each other between the rearward-facing reflective surface of the mirror and an external surface of the door. A tab can be coupled to an interior edge of the enveloping portion with the tab having a first engagement member for coupling to a first cooperating structure located on an internal surface of said door.

A second vehicle body protector of the present invention is intended to protect a lower portion of the side of a vehicle located longitudinally rearward of the front wheel well, longitudinally forward of the rear wheel well, and vertically below any door openings. The vehicle body protector is formed by a sheet of impact absorbing material and includes a forward central portion configured to extend from the front wheel well along the side of a vehicle below any door opening and a forward flap portion coupled to the forward central portion that is configured to extend into the front wheel well. The forward flap portion has a first engagement member for coupling the forward flap portion to a first cooperating structure located inside the front wheel well. An upper flap portion is coupled to the forward central portion and is configured to extend into the door opening. The upper flap portion has a second engagement member for coupling to a second cooperating structure located inside the threshold of the door opening. A lower flap portion is coupled to the forward central portion and is configured to extend under the side of the vehicle. The lower flap portion has a third engagement member for coupling to a third cooperating structure located inward of the innermost margin of the side of the vehicle body. The second vehicle body protector preferable also includes a rear-central portion configured to extend from the rear wheel well longitudinally forward along the side of the vehicle below any door opening. The rear-central portion is coupled to or made unitary with the forward central portion so that the entire side of the vehicle below any door opening is entirely covered by the second vehicle body protector. A rearward flap portion is coupled to the rear-central portion and is configured to extend into the rear wheel well where a fourth engagement member is provided for coupling to a fourth cooperating structure located inside the rear wheel well.

The engagement members that are used with the vehicle body protectors of the present invention can be in the form of a plurality of discrete fasteners spaced from each other and positioned to engage a cooperating plurality of fasteners fixed to the vehicle body. Alternatively, the engagement members can be in the form of a continuous fastener strip fixed along a margin of a flap portion and positioned to engage in at least a partially continuous cooperating fastener strip fixed to the vehicle body. Other fastening members can be employed such as spring clamps and magnets.

The vehicle body protectors of the present invention are preferably made of at least two layers of material. The layers can include one or more layers of impact absorbing material, a liner layer that will protect the outer finish of the vehicle body, and one or more reinforcing layer to inhibit unwanted deformation of the body protector. In a preferred embodiment, at least the liner layer comprises a hydrophobic material that will reduce the moisture contact with the finish of the vehicle while the outer-most layer includes capillary channels for drawing water away from the liner layer.

Other features and advantages of the present invention will become apparent to those skilled in the art from the following description of preferred embodiments of the invention that are depicted in the drawings, to which the following description makes specific reference.

BRIEF DESCRIPTION OF THE DRAWINGS

FIG. 5 is another perspective view of a body protector of the present invention intended to protect a lower portion of the side of a vehicle.

FIG. 6 is a sectional view taken along line 6—6 of FIG. 5.

FIG. 7 is a side elevation detail of an overlapping section of one of the body protectors shown in FIG. 1.

DESCRIPTION OF PREFERRED EMBODIMENTS

Figure 1:
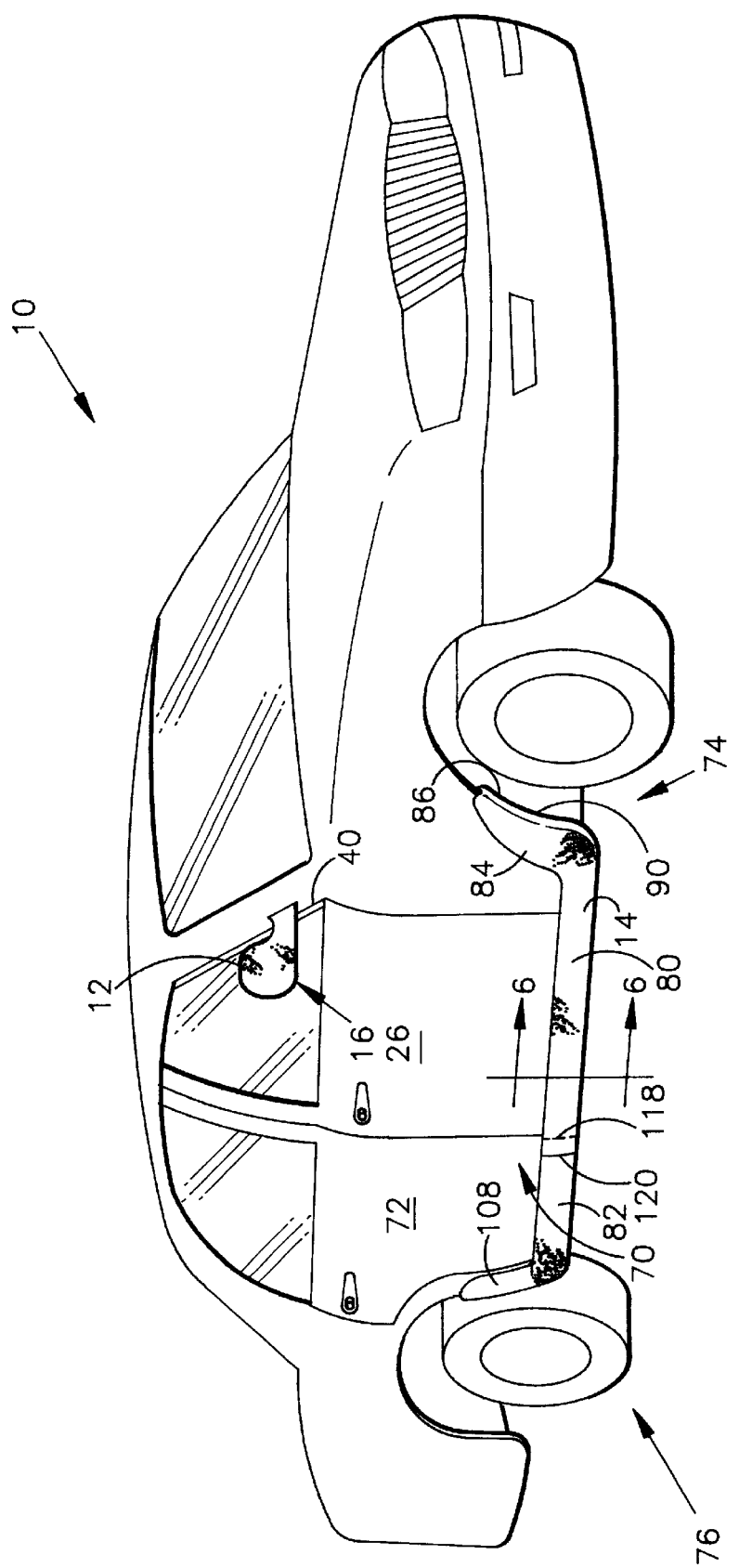
FIG. 1 is a perspective view of a vehicle including body protectors of the present invention.
Figure 2:
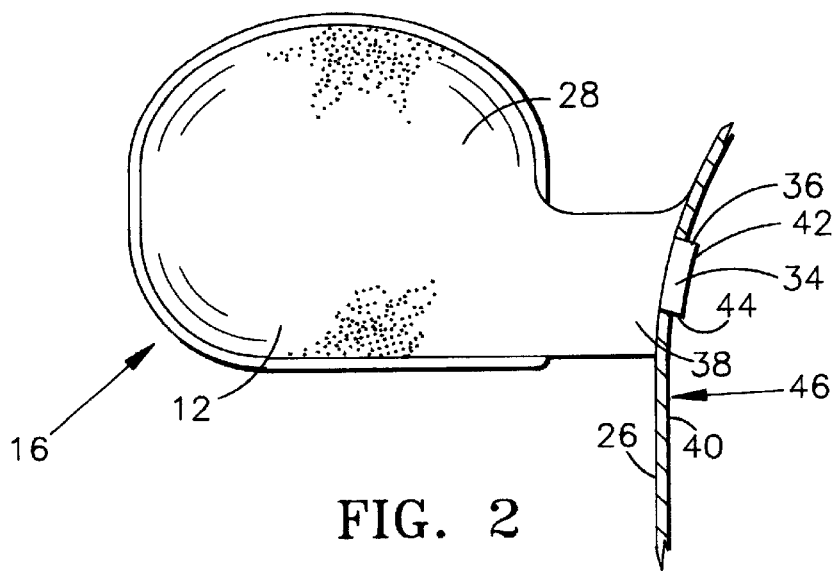
FIG. 2 is a front elevation view of a body protector of the present invention for an external mirror.
Figure 3:
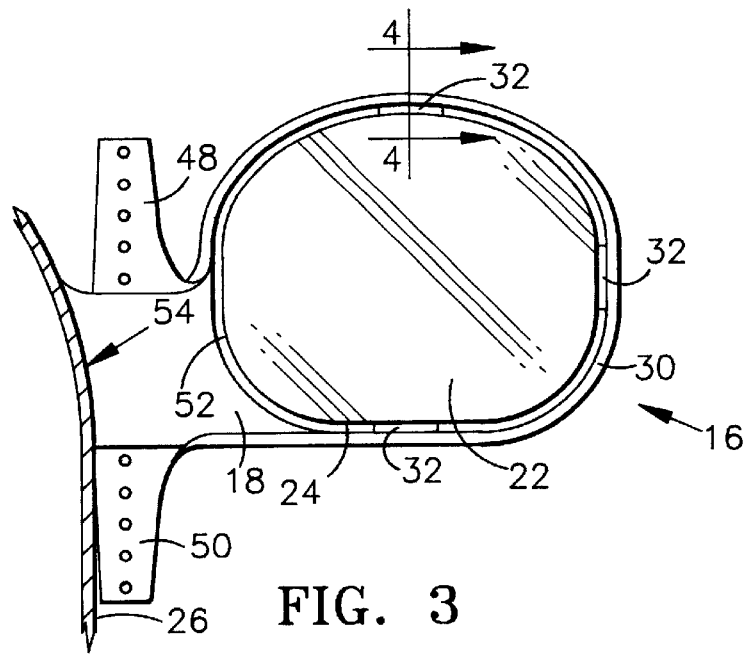
FIG. 3 is a rear elevation view of the body protector and mirror shown in FIG. 2.
Figure 4:
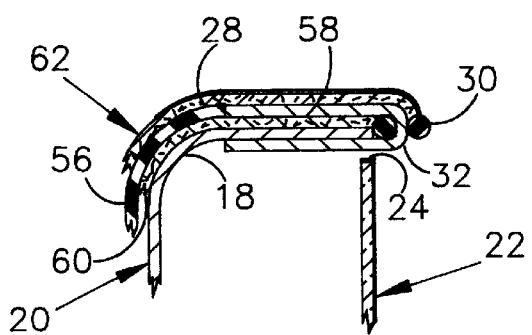
FIG. 4 is a sectional view taken along line 4—4 of FIG. 3.

A motor vehicle 10 is shown in FIG. 1 having two body protectors 12 and 14 according to the present invention. The body protector 12, shown in greater detail in FIGS. 2–4, is intended to protect an external mirror 16 that includes a shell 18 having a forward-facing decorative surface 20 that is prone to suffer body damage arising from flying road debris such as stones, as well as bug stains, road grime, and tar as the vehicle 10 is being driven. The mirror 16 also includes a rearward-facing reflective surface 22 that generally has a perimeter 24 that is spaced from the shell 18 to permit adjustment of the reflective portion 22 without requiring movement of the shell 18. The external mirror 16 is typically coupled to a door 26 of the motor vehicle 10 so that a driver of the vehicle 10 can view the left or right side of the vehicle. While FIG. 1 only depicts a single mirror 16, it will be appreciated that similar mirrors are often mounted on both sides of the vehicle 10, and the body protectors 12 and 14 of the present invention are intended for use on either or both sides of the vehicle 10.

The vehicle body protector 12 for the external mirror 16 includes an enveloping portion 28 contoured to fit over the decorative forward-facing surface 20 of the exterior mirror shell 18. A collar portion 30 is contoured to surround the shell 18, yet leave exposed, the rearward-facing reflective surface 22. U-shaped fasteners 32 are provided that engage the shell 18 outside the perimeter 24 of the rearward-facing reflective surface 22 to retain the collar portion 30 at the desired location. The number of fasteners 32 that are included can vary with both size and shape of the mirror shell 18. Another fastener 34 is preferably coupled to a tab 36 on an interior edge 38 of the enveloping portion 28, the tab extending around a front edge 40 of the door 26. The fastener 34 includes an engagement member 42 for coupling to a cooperating structure 44 located on an internal surface 46 of the door 26. The vehicle body protector 12 also includes two sets of fasteners 48 and 50 that connect to each other between an inner edge 52 of the rearward-facing reflective surface 22 and an outer surface 54 of door 26. The connection between fasteners 48 and 50 is generally visible to the driver of the vehicle 10 so that any loosening of the fasteners can be easily detected and promptly remedied by the driver. While each of the sets of fasteners 48 and 50 are shown to be in the form of a single row of discrete fasteners, such as snap fasteners, it will be appreciated that other forms of fasteners can be used.

The vehicle body protector 12 is shown to include a layer 56 of impact absorbing material such as a soft vinyl that will cushion the exterior mirror shell 18 from impact by flying objects. A liner layer 58 is also included that will protect the outer finish of the exterior mirror shell 18. The liner layer 58 preferably comprises a hydrophobic material that will reduce the moisture contact with the finish of the mirror shell 18. One particularly suitable material for the liner layer 58 is micro-textured Teflon®. The body protector 12 also includes a reinforcing layer 60 to inhibit unwanted deformation of the body protector 12 by the passing flow of air as the motor vehicle 10 is being driven. One particularly suitable material for the reinforcing layer 60 is a mesh of oriented PET (polyethylene terephthalate). An outer layer 62 is provided that is preferably decoratively colored to coordinate with the color of the exterior of the vehicle 10. The outer layer 62 preferably includes substantially invisible capillary channels for drawing water away from the more inner liner layers.

The vehicle body protector 14 is intended to protect a lower portion 70 of the side 72 of vehicle 10, the lower portion 70 being located longitudinally rearward of the front wheel well 74, longitudinally forward of the rear wheel well 76, and vertically below any door openings 78. The vehicle body protector 14 can be a one-piece construction as shown in FIG. 5 or a two-piece construction as shown in FIGS. 1 and 7. In the two-piece construction, the vehicle body protector includes a forward portion 80 for protecting the vehicle 10 from the front wheel well 74 rearward, and a rearward portion 82 for protecting the vehicle 10 from the rear wheel well 76 forward to the forward portion 80, the two portions 80 and 82 generally overlapping as shown in FIGS. 1 and 7.

The one-piece vehicle body protector 14, and the forward portion 80 of the two-piece body protector 14, includes a forward central portion 84 configured to extend from the front wheel well 74 along the side of the vehicle 10 below the door opening 78. A forward flap portion 86 is coupled to the forward central portion 84 and is configured to extend into the front wheel well 74. The forward flap portion 86 has engagement member 88 for coupling the forward flap portion 86 to a cooperating structure 90 located inside the front wheel well 74. An upper flap portion 92 is coupled to the forward central portion 84 and is configured to extend into the door opening 78. The upper flap portion 92 has an engagement member 94 for coupling to cooperating structure 96 located inside the threshold 98 of the door opening 78 as shown in FIG. 6. A lower flap portion 100 is coupled to the forward central portion 84 and is configured to extend under the vehicle 10. The lower flap portion 100 has an engagement member 102 for coupling the lower flap portion to cooperating structure 104 located inward of the innermost margin 106 of the side of the vehicle 10. As shown in FIG. 5, the vehicle body protector 14 also includes a rear-central portion 108 configured to extend from the rear wheel well 76 longitudinally forward along the side of the vehicle 10 below any door opening 78 to unitarily join with the forward central portion 84. A rearward flap portion 110 is coupled to the rearward central portion and configured to extend into the rear wheel well 76. The rearward flap portion 110 includes engagement members 112 for coupling to cooperating structure 114 located inside the rear wheel well 76.

The rear-central portion 108 and rearward flap portion 110 are included in the rearward portion 82 of the two-piece construction of the vehicle body protector 14 as shown in FIG. 1. In the two-piece construction, a forward margin 118 of the rear-central portion 108 preferably extends under a rearward margin 120 of the forward central portion 84 so that the forward margin 118 of the rear-central portion 108 is overlapped. Cooperating fasteners 122 and 124, such as fabric hook and eye fasteners, can be provided as shown in FIG. 7, to secure the margins 118 and 120 together.

The vehicle body protector 14 is preferably constructed of a plurality of layers as previously described in connection with vehicle body protector 12. The various fasteners to be employed to secure the vehicle body protector 14 to the vehicle 10 can be varied as needed to best suit the construction of the vehicle 10. Other variations will be apparent to those skilled in the art based on the foregoing discussion and the appended claims defining the invention.

What is claimed is:

1. A vehicle body protector for covering a portion of a side of a vehicle located longitudinally rearward of a front wheel well and vertically below the door openings, the vehicle body protector formed by a sheet of impact absorbing material and comprising:
    a forward central portion configured to extend from the front wheel well along the side of a vehicle below the door opening,
    a forward flap portion coupled to the forward central portion and configured to extend into the front wheel well, the forward flap portion having a first engagement member for coupling to a first cooperating structure located inside the front wheel well,
    an upper flap portion coupled to the forward central portion and configured to extend into the door opening and having a second engagement member for coupling to a second cooperating structure located inside a threshold of the door opening, and
    a lower flap portion coupled to the forward central portion and configured to extend under the side of the vehicle and having a third engagement member for coupling to a third cooperating structure located inward of an innermost margin of the side of the vehicle body.

2. A vehicle body protector according to claim 1 further comprising a rearmost margin extending generally vertically from the upper flap portion the lower flap portion.

3. A vehicle body protector according to claim 1 further comprising a rearward flap portion coupled to the forward central portion and configured to extend into a rear wheel well and having a fourth engagement member for coupling to a fourth cooperating structure located inside the rear wheel well.

4. A vehicle body protector according to claim 2 and further comprising a rear-central portion configured to extend from a rear wheel well and forward along the side of a vehicle below the door opening,
    a rearward flap portion coupled to the rear-central portion and configured to extend into the rear wheel well and having a fourth engagement member for coupling to a fourth cooperating structure located inside the rear wheel well,
    a second upper flap portion coupled to the rear-central portion and configured to extend into the door opening and having a second engagement member for coupling to the second cooperating structure located inside a threshold of the door opening,
    a second lower flap portion coupled to the rear-central portion and configured to extend under the side of the vehicle and having a third engagement member for coupling to the third cooperating structure located inward of an innermost margin of the side of the vehicle body, and
    a forward margin coupled to and extending under said rearmost margin so that the rear-central portion and said rearmost margin overlap.

5. A vehicle body protector for covering a portion of a side of a vehicle located longitudinally forward of a rear wheel well and vertically below the door opening, the vehicle body protector formed by a sheet of impact absorbing material and comprising:
    a rear-central portion positioned contiguous to an outer surface of the vehicle,
    a rearward flap portion coupled to the rear-central portion and configured to extend into the rear wheel well and having an engagement member for coupling to a cooperating structure located inside the rear wheel well,
    a second upper flap portion coupled to the rear-central portion and configured to extend into the door opening and having another engagement member for coupling to the cooperating structure located inside a threshold of the door opening,
    a second lower flap portion coupled to the rear-central portion and configured to extend under the side of the vehicle and having a further engagement member for coupling to cooperating structure located inward of an innermost margin of the side of the vehicle body, and
    a forward margin of the rear-central portion being adapted to extend under the other vehicle body protector so that the forward margin of the rear-central portion is overlapped.

6. A vehicle body protector according to any of claims 1–5 wherein at least one of the engagement members comprises a plurality of discrete fasteners spaced from each other and positioned to engage a cooperating plurality of fasteners fixed to the vehicle body.

7. A vehicle body protector according to any of claims 1–5 wherein at least one of the engagement members comprises a continuous fastener strip fixed along a margin of a flap portion and positioned to engage an at least partially continuous cooperating fastener strip fixed to the vehicle body.

8. A vehicle body protector according to any of claims 1–5 wherein the sheet of impact absorbing material comprises an outer layer and a liner layer positioned on an under surface of the outer layer for engagement with said outer surface of the vehicle body.

9. A vehicle body protector according to claim 8 further comprising an intermediate reinforcing layer.

10. A vehicle body protector according to claim 8 wherein at least the liner layer comprises a hydrophobic material and the outer layer includes channels for drawing water away from the liner layer.

* * * * *